W. E. STANDLEY.
WINDOW GLASS BLOWING HEAD.
APPLICATION FILED NOV. 17, 1915.
1,307,381.
Patented June 24, 1919
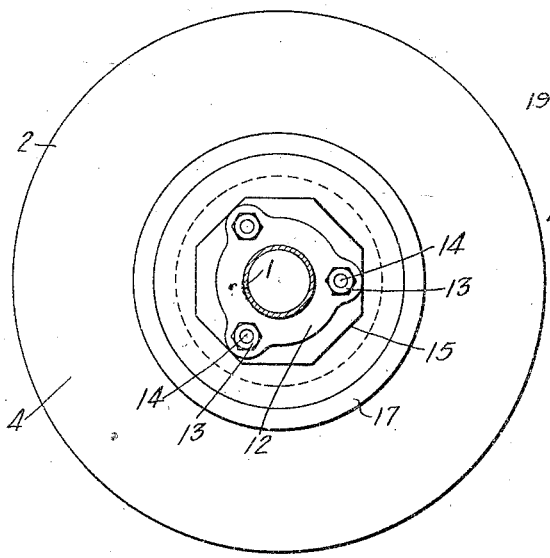
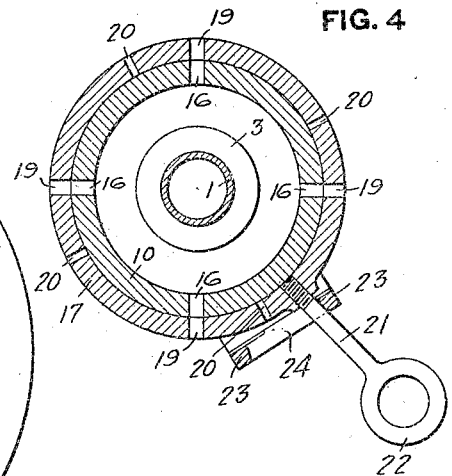
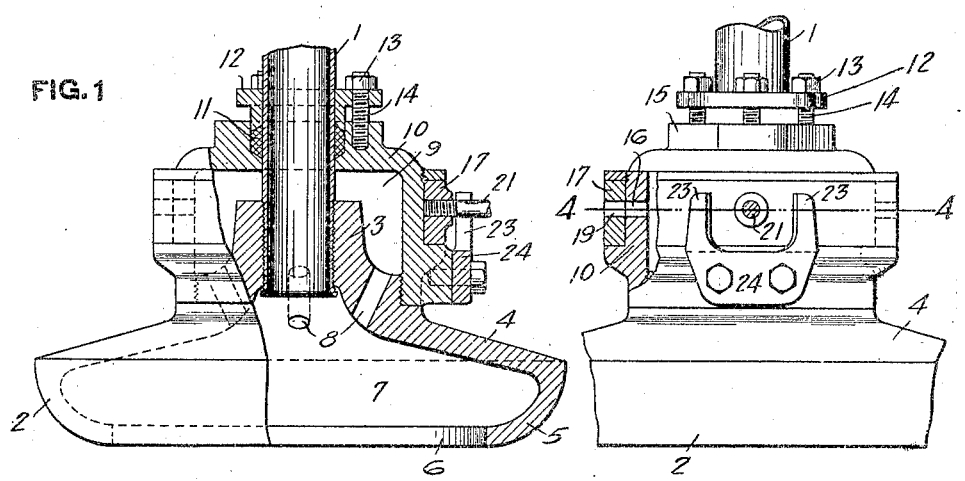
WITNESSES
INVENTOR
William E. Standley,
By Fredk W. Winter,
Attorney.

UNITED STATES PATENT OFFICE.

WILLIAM E. STANDLEY, OF PITTSBURGH, PENNSYLVANIA, ASSIGNOR TO WINDOW GLASS ROTARY POT COMPANY, OF PITTSBURGH, PENNSYLVANIA, A CORPORATION OF PENNSYLVANIA.

WINDOW-GLASS-BLOWING HEAD.

1,307,381.   Specification of Letters Patent.   Patented June 24, 1919.

Application filed November 17, 1915. Serial No. 61,974.

*To all whom it may concern:*

Be it known that I, WILLIAM E. STANDLEY, a resident of Pittsburgh, in the county of Allegheny and State of Pennsylvania, have invented a new and useful Improvement in Window-Glass-Blowing Heads, of which the following is a specification.

This invention relates to window glass blowing heads.

One common machine for making window glass consists of a hollow drawing head mounted to move vertically and connected to a conduit for supplying air thereto. Said head, at its lower end, carries what is known as a "bait," which is dipped into the molten glass and is then elevated at a uniform speed while air under pressure is supplied through said conduit. The molten glass clings to the bait so that a hollow glass cylinder is pulled up thereby as the head is elevated, the air pressure expanding said cylinder to a diameter larger than that of the bait. By carefully adjusting the rate of upward travel of the bait and the air pressure therein a glass cylinder is drawn of any desired size and is then cut off from the bait and from any remaining molten glass in the pot, slitted longitudinally and opened out flat to form a sheet. The quality and thickness of the glass depend entirely upon the uniformity of the drawing operation, since variations either in the rate of upward travel of the bait or in the air pressure within said hollow cylinder produces wavy glass or a cylinder of non-uniform diameter or thickness, and consequently an uneven or irregular surface on the final sheet.

The object of this invention is to provide an improved glass drawing head which is of simple construction and can be manipulated more readily and efficiently than the usual forms of such heads, and one which enables the flow of air to and from the hollow bait to be regulated to maintain a uniform pressure within the hollow cylinder and which avoids pulsations in the air current and the production of a wavy or otherwise uneven cylinder. Further objects of the invention are to provide an improved device for regulating the escape of the excess air in a manner to avoid conflict of said air with the incoming stream, and in which the air is allowed to escape from the cylinder closely adjacent to the hollow bait and therefore before it has flowed upwardly beyond the bait with opportunity to cool and contract.

Further objects of the invention are in part obvious and in part will appear more in detail hereinafter.

The invention comprises the window glass blowing head hereinafter described and claimed.

In the drawings, which represent one embodiment of the invention, Figure 1 is in part a side elevation and in part a sectional elevation, illustrating the blowing head and the lower end of the conduit to which it is attached; Fig. 2 is a plan view thereof; Fig. 3 is a side elevation from the right in Fig. 1, and partly broken out and in section through the regulating valve ring; and Fig. 4 is a cross sectional view on the line 4—4, Fig. 3.

The window glass blowing head shown in the drawings comprises a pipe or conduit 1, which, as is usual, is detachably connected to the lower end of a vertically traveling telescoping air supply pipe (not shown), and through which air under pressure is supplied for expanding the glass cylinder. This conduit 1 also forms the support for the hollow bait 2, which is a massive metal member having a hollow boss 3 threaded upon the lower end of the pipe 1, and a downwardly flaring upper wall 4 diverging at a wide angle and whose periphery is united or in one piece with the downwardly and inwardly extending curved flange or ledge 5 surrounding a central wide opening 6. The curved flange or ledge 5 is introduced into the molten glass in the pot which flows up through the opening 6 part way into the cavity or chamber 7 within the bait 4, and adheres to the flange 5, so as to attach the glass cylinder to the bait and enable it to be lifted from the pot.

Experience has shown that the air supply to the hollow bait must be in excess of that required to fill the increasing volume within the cylinder being formed, so as to maintain pressure therein and therefore expand said cylinder and allow expansion of the air by the heat of the molten glass. A uniform pressure is maintained by providing a relief or vent from the hollow bait through which a portion of the air is allowed to escape to the atmosphere, the relief openings usually being at or near the upper end of the conduit 1, which necessitates the simultaneous downward travel of the cold air and the upward travel of the hot air through said pipe, the conflicting streams commonly producing a pulsating effect and wavy glass cylinders.

In my improved drawing head the excess air is vented at or near the lower end of the conduit 1, so that all of the air in said conduit travels downwardly and conflicting streams and the resultant pulsating effect are avoided. Preferably the air is vented below the lower end of the pipe 1, for example, through ports or openings 8 in the upper wall of the bait just below the lower end of the pipe 1. These ports, four of which are shown for purposes of illustration, communicate with an annular chamber 9 in a hollow casing 10 surrounding the lower end of the pipe 1, and which casing is illustrated as threaded to an annular shoulder of the bait 2 and sealed around the pipe 1 by a packing 11 compressed by a gland 12 which may be adjusted to tighten the packing in any suitable manner, as by several nuts 13 on bolts 14 threaded into the upper end of the casing 10. Said casing is also provided with a non-circular portion 15 forming a wrench hold for attaching it to and removing it from the bait.

The air vented to chamber 9 is allowed to escape therefrom through several ports or openings 16, preferably so arranged as to enable the flow to be regulated so as to compensate for variations in pressure and temperature and maintain a substantially uniform pressure within the hollow glass cylinder. As shown, the several ports 16 extend radially through the outer wall of the casing 10, around which is a regulating valve ring 17 provided with several sets of ports, one set for each of the ports 16. In the form shown the ring 17 is provided adjacent each of the ports 16 with a large port 19 of the same area as the port 16, and a port 20 of smaller area. It is also provided with a suitable operating handle, shown as a rod 21 extending outwardly and provided with a finger hold 22. Said handle works between the upwardly extending arms 23 of a stop plate 24 attached to the bait 2. In one position of the handle 21, when it contacts with one of said arms 23, the large ports 19 register with the ports 16, so that a maximum flow of air from the hollow bait is permitted, while in the other position of said arm, when it rests against the other arm 23, the smaller ports 20 register with the port 16, and a smaller relief effect is produced. By slight adjustments of the ring 17 away from the two positions just described only partial registration of the ports 19 and 20 with port 16 is effected, so that the relief can be cut down to any desired amount. The intermediate position of arm 21, midway between the stop arms 23, is the blank position of the valve, in which no air whatever is allowed to escape from the hollow cylinder.

The glass blowing head described is of simple construction and collects all of the air relief devices at the lower end of the conduit 1, which not only holds the heat and prevents too sudden cooling of the glass and enables the regulating valve mechanism to be operated conveniently, but also does away entirely with conflicting air currents in the pipe 1, and the tore avoids pulsating effects and the production of a wavy glass cylinder. By properly manipulating the pressure of the air supply to the conduit 1 and the rate of upward movement of said pipe the glass cylinder may be expanded to any diameter and can be drawn to any length within the capacity of the pot. It has a uniform diameter from end to end and produces a flat sheet practically free of imperfections and of better quality than with the usual forms of apparatus.

What I claim is:—

1. A glass blowing head, comprising a hollow bait for engaging molten glass, a conduit for compressed air communicating with the chamber in said bait, said bait being provided with a series of openings through its wall around the conduit opening to permit the escape of air, a casing inclosing a chamber on the outer face of said bait and with which said perforations communicate, the wall of said casing being provided with an opening, and a ring mounted on the outside of said casing adapted to turn thereon and having perforations of different sizes adapted to register alternately with the opening through the wall of said casing to regulate the escape of air from said bait.

2. A glass blowing head, comprising a hollow bait having an inturned flange for engaging molten glass, a source of compressed air communicating with the chamber in said bait, the outer wall of said bait being provided with a series of perforations to permit the escape of air, a casing on the outer side of said bait inclosing a chamber with which said perforations communicate, a ring rotatably mounted on the outside of said casing, said ring and the wall of said casing having perforations of different sizes adapted to be brought into register alternately, and means to manually adjust the position of said ring to control the amount of air escaping from the interior of said bait.

3. A glass blowing head, comprising a bait adapted to engage molten glass and inclosing a chamber, a compressed air conduit connected centrally to and carrying said bait, perforations through the walls of said bait around said conduit, an annular chamber on the outer face of said bait with which said perforations communicate, and a ring rotatably mounted on the outside of the bait, said ring and the wall of said annular chamber having perforations of different sizes adapted to be brought into register alternately, said ring being manually adjusted to bring the perforations of different sizes into register to thereby control the amount of air escaping from the interior of said bait.

In testimony whereof, I have hereunto set my hand.

WILLIAM E. STANDLEY.

Witnesses:
 GLENN H. LERESCHE,
 ELBERT L. HYDE.